W. E. TAYMAN.
HAND TRUCK.
APPLICATION FILED JAN. 27, 1913.
1,103,162.
Patented July 14, 1914.
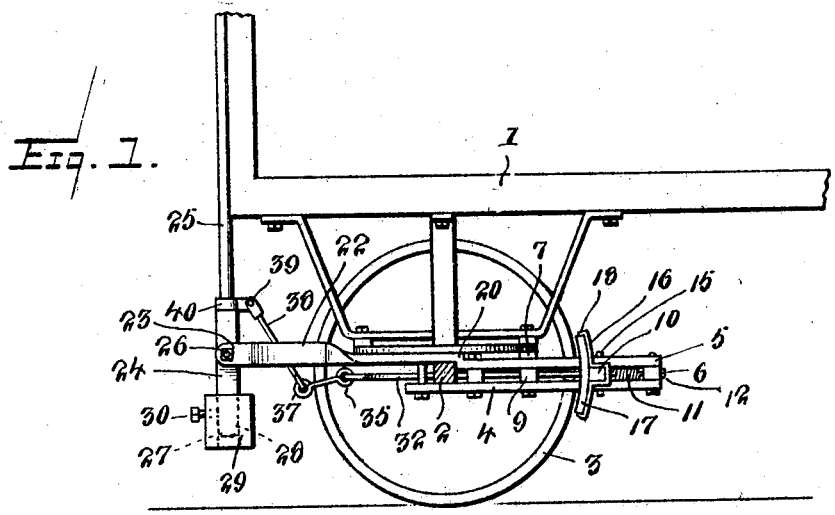
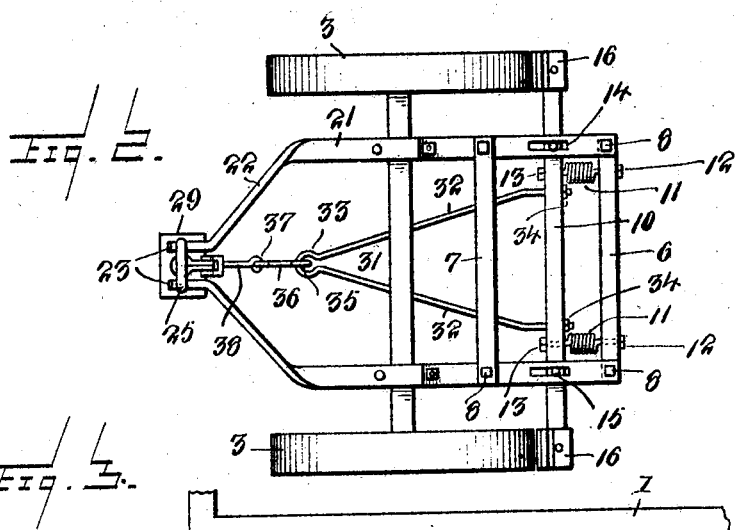
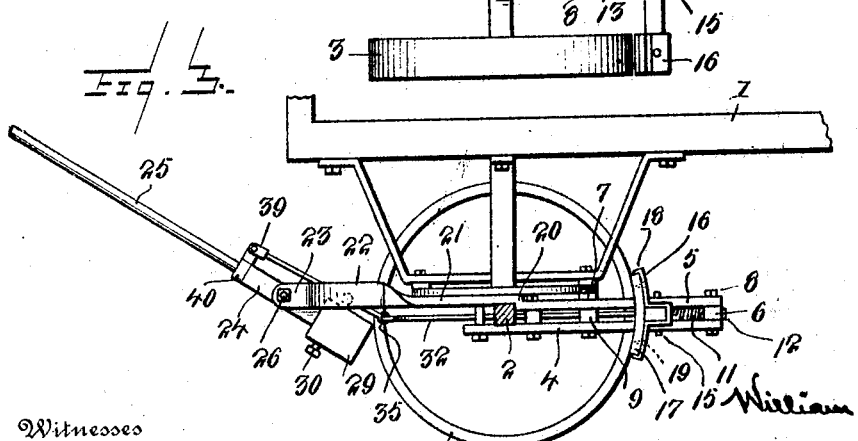
Inventor
William E. Tayman
Witnesses
John C. Rathbone
By
P. J. Lockwood
Attorneys

UNITED STATES PATENT OFFICE.

WILLIAM E. TAYMAN, OF WASHINGTON, DISTRICT OF COLUMBIA.

HAND-TRUCK.

1,103,162. Specification of Letters Patent. Patented July 14, 1914.

Application filed January 27, 1913. Serial No. 744,466.

*To all whom it may concern:*

Be it known that I, WILLIAM E. TAYMAN, a citizen of the United States of America, residing at 1928 Naylor road southeast, Washington, District of Columbia, have invented certain new and useful Improvements in Hand-Trucks, of which the following is a specification.

This invention relates to hand trucks, and particularly to those which are generally used at railroad stations, express offices and like places for transporting packages between the cars and the station.

An object of the invention is the provision of a truck of this character wherein will be provided a brake beam which will be positively actuated or influenced through movements of the pulling handle.

Another object of the invention is the provision of brake mechanism which will be rendered operative when the pulling handle is adjusted to a point below the pulling position.

A further object of the invention is the provision of means for automatically restoring the handle to a perpendicular position when the truck is at rest, so as to prevent persons from accidentally stumbling over the same when hurrying to and from a train.

A still further object of the invention is the provision of a brake mechanism wherein almost the full weight of the operator may be applied to the handle to lower the same below a pulling position, so as to instantly apply the shoes and to maximize their locking efficiency against the wheels.

Another object of the invention is the provision of a device of this character which may be quickly applied to almost any standard form of hand truck without requiring great changes in the construction thereof.

With these and other objects in view, the invention consists of certain novel features of construction, combination and arrangement of parts, as will be hereinafter described and claimed.

In the accompanying drawings:—Figure 1 is a side view of a portion of the truck, showing one of the supporting wheels removed and illustrating the handle in its normal perpendicular position; Fig. 2 is a top plan view, showing parts of the truck structure removed, so as to clearly illustrate the invention; and Fig. 3 is a view similar to Fig. 1, showing the pulling handle adjusted for the application of the brake shoes against the wheel.

The truck structure conventionally shown herein is of the form generally used at railroad stations, freight offices or the like, and it is shown to include a body member 1 having a supporting axle 2, on which wheels 3 are adapted to freely revolve. While but one axle is shown herein, it is obvious that the truck will be supplied with two of such axles and four supporting wheels. However, it is evident that any number of such supporting axles and wheels may be employed as may be found most practical for the purpose.

The brake mechanism comprises parallel bottom bars 4, which underlie parallel upper bars 5, the latter being connected with the former through the medium of a rear bar 6 and a front bar 7. The bars 6 and 7 are preferably bolted at 8 to the upper and lower bars 4 and 5, as clearly shown in Fig. 2, spacing blocks 9 being interposed between the upper and lower bars 4 and 5 in line with the bolts 8 of the bar 7. The bar 6 also forms a spacing element to hold the lower bars 4 and the upper bars 5 in proper spaced relation relatively, so as to permit them to operatively accommodate a sliding brake beam 10. Springs 11 are connected at 12 to the bar 6 and at 13 with the brake beam 10, so as to exert their force to hold the brake beam in an inoperative position. The upper and lower bars 4 and 5 are provided with longitudinally extending slots 14, into which are projected the ends of pins 15 which extend from the brake beam 10. The ends of the brake beam are extended beyond the sides of the bars 4 and 5 and secured to said extensions are shoe retaining straps 16 in which are removably mounted shoes 17 of hard wood or other preferred well known material. The extremities of the straps 16 are extended to overlie the ends of the brake shoes as at 18. Screws 19 may be employed for the purpose of effectually holding the shoes to the straps, as shown.

The upper bars 5 are offset at 20, so as to lie slightly above the plane of the axle 2. The bars are then extended forwardly as at 21, and then inwardly at 22 toward the longitudinal center of the truck and then provided with parallel ears 23 which receive therebetween a rectangular portion 24 of a pulling handle 25. A bolt 26 extends through the ears 23 and through the portion 24 of the handle, so that the latter is free to swing vertically between the ears, as will be understood. At a point below the pivot 26, the handle is provided with an extension 27 which fits in a correspondingly formed passage 28 in a counterbalancing weight 29. The weight may be secured in any desired position on the extension 27 through the medium of a screw 30. By means of the counterbalancing weight it is evident that the handle 25 is normally held in the perpendicular position illustrated in Fig. 1. The power transmitting means between the pulling handle 25 and the brake beam 10 comprises a substantially V-shaped draft element 31 having legs 32 which are connected with each other through the axial center of the truck by means of a clevis eye 33. The legs are adjustably connected at 54 to the brake beam 10 at points preferably in juxtaposition with the springs 11. It is desirable to provide for such adjustment in order that the operator may compensate for wear in the different parts of the device. The construction also permits of adjustments of the shoes 16 relatively of the wheels of the truck, as will be understood. The clevis eye 33 receives the eye 35 of a vertical tilting link 36. The eye 37 of said link is connected with a pull rod 38 which has pivotal connection at 39 with a clip 40 which is secured to the pulling handle 25 at a point immediately above the portion 24 of said handle.

Having thus described my invention, what I claim is:—

1. The combination with a wheeled axle and a truck body supported thereon, of a horizontal frame connected with the axle and provided with superposed spaced portions, a brake beam slidable between said portions, a pivoted handle supported from the frame, means for normally holding the handle in a vertical position, and means between the handle and the brake beam for moving the latter in the direction of the wheels of the axle when the handle is adjusted to a point below the pulling position, and means for holding the brake beam in an inactive position when the handle is in an active pulling position.

2. The combination with a wheeled axle and a truck body supported thereon, of a frame secured to the axle and comprising superposed pairs of bars, spacing blocks between the bars, a brake beam slidable between the bars, the upper bars of the frame being extended to points beyond the forward ends of the lower bars, a pivoted handle mounted between the extended ends of the upper bars, means between the handle and the brake beam for moving the latter in one direction, and means for holding the brake beam in an inactive position on prescribed movements of the handle.

In testimony whereof I have affixed my signature in presence of two witnesses.

WILLIAM E. TAYMAN.

Witnesses:
 RENAUD MARTEL,
 JAMES A. KOEHL.